US006692039B2

United States Patent
Topf, Jr.

(10) Patent No.: US 6,692,039 B2
(45) Date of Patent: Feb. 17, 2004

(54) INTERNAL CONDUIT SEALING INSTALLATION

(75) Inventor: Henry E. Topf, Jr., Greencastle, IN (US)

(73) Assignee: Hunting HTI Rehab, Inc., LLC, Lancaster, OH (US)

(*) Notice: Subject to any disclaimer, the term of this patent is extended or adjusted under 35 U.S.C. 154(b) by 29 days.

(21) Appl. No.: 10/071,160

(22) Filed: Feb. 8, 2002

(65) Prior Publication Data

US 2003/0151249 A1 Aug. 14, 2003

(51) Int. Cl.$^7$ ................................................ F16L 21/00
(52) U.S. Cl. ........................ 285/370; 285/397; 285/15; 138/97
(58) Field of Search ................................ 285/109, 370, 285/397, 15, 55; 405/152; 138/97

(56) References Cited

U.S. PATENT DOCUMENTS

| 2,615,740 A | 10/1952 | Nathan |
| 4,117,201 A | * 9/1978 | Keifert ........................ 138/148 |
| 4,303,103 A | 12/1981 | Marks et al. |
| 4,346,922 A | 8/1982 | Ohtsuga et al. |
| 4,469,467 A | 9/1984 | Odill et al. |
| 4,513,996 A | 4/1985 | Jost |
| 4,685,704 A | 8/1987 | Kolar |
| 4,927,189 A | 5/1990 | Burkit |
| 5,102,263 A | 4/1992 | Allen et al. |
| 5,254,127 A | * 10/1993 | Wholey et al. ............. 285/397 |
| 5,667,252 A | 9/1997 | Schafer et al. |
| 5,888,023 A | 3/1999 | Grabe et al. |
| 6,126,206 A | 10/2000 | Topf, Jr. |

FOREIGN PATENT DOCUMENTS

| DE | 3445871 | * 6/1986 |
| GB | 2038976 | * 7/1980 |
| GB | 2042118 | * 9/1980 |

* cited by examiner

Primary Examiner—David Bochna
(74) Attorney, Agent, or Firm—Anthony S. Zummer

(57) ABSTRACT

A sealing installation mountable in the interior of a conduit. The installation includes a resilient connector sleeve having connector sealing assemblies at opposite ends of the sleeve. A first seal sleeve has seal sleeve sealing assemblies on opposite ends thereof has one seal sleeve sealing assembly engaging one of the connector sealing assemblies and the other seal sleeve sealing assembly in sealing contact with the interior of the conduit. A second seal sleeve has second seal sleeve sealing assemblies on opposite ends. One second seal sleeve sealing assembly engages a connector sealing assembly and the other seal sleeve sealing assembly is in sealing contact with the interior of the conduit.

18 Claims, 2 Drawing Sheets

INTERNAL CONDUIT SEALING INSTALLATION

BACKGROUND OF THE INVENTION

Conduits are used to transport a variety of fluids. Some of the fluids are highly corrosive fluids and gasses and highly erosive slurries. These fluids create longitudinal or axial damage to the interior of the conduit during the life of the conduit. The damage results in cracks or other leaks in the conduit requiring repair or replacement of the conduit. Internal seals may be used to correct damage which has occurred in a conduit. Some of the internal seals are annular resilient members which cover the portion of the conduit with the leak or crack. In many instances, leakage of a conduit is known; however, the extent of the damage to the conduit is not known until the operation of the conduit is shut down and an inspection of the interior of the conduit is made. It is desirable to provide an interior sealing installation for a variety of reasons including avoiding the necessity of digging up the conduit. The utilization of an interior sealing installation allows the length of the seal to be extended as is necessary to overcome a particular damage to the conduit. It is of utmost importance to provide a sealing installation which may be readily and quickly installed to minimize disruption caused by interrupting the flow of fluid through the conduit.

SUMMARY OF THE INVENTION

The present invention is a sealing installation mounted in the interior of a conduit for internally sealing the conduit to prevent leakage from the conduit. The installation includes a resilient connector sleeve having a continuous connector body with opposed ends. A connector sealing assembly is formed integral with each end of the connector body. Each connector sealing assembly is a mirror image of the opposed connector sealing assembly. The connector sleeve is oriented with each connector sealing assembly extending inward toward the interior of the conduit. A first seal sleeve has a resilient continuous seal sleeve body with opposed ends. A seal sleeve sealing assembly is formed integral with each end of the seal sleeve body. One of the seal sleeve sealing assemblies is in sealing engagement with one of the connector sealing assemblies. A retaining band is connected to the one seal sleeve sealing assembly holding the one seal sleeve sealing assembly in sealing engagement with the one connector sealing assembly. The other seal sleeve sealing assembly is in sealing engagement with the interior of the conduit. A second retaining band is connected to the other seal sleeve sealing assembly holding the other seal sleeve sealing assembly in sealing engagement with the interior of the conduit. A second seal sleeve has a resilient continuous second sleeve body with opposed ends. A second seal sleeve sealing assembly is mounted on each end of the second sleeve seal body. One of the second seal sleeve assemblies is in sealing engagement with the other of the connector sealing assemblies. A third retaining band is connected to the second seal sleeve sealing assembly holding the second seal sleeve sealing assembly is in sealing engagement with the other connector sealing assembly. The other second seal sleeve sealing assembly is in sealing engagement with the interior of the conduit. A fourth retaining band is connected to the other second seal sleeve sealing assembly holding the other second seal sleeve sealing assembly in sealing engagement with the interior of the conduit. The sealing installation provides a continuous seal within the interior of the conduit from the other second seal sleeve sealing assembly to the other seal sleeve sealing assembly and thereby provides a sealing installation which seals an elongated crack or an elongated series of pits in the conduit.

DETAILED DESCRIPTION OF THE PREFERRED EMBODIMENT

Figure 1:
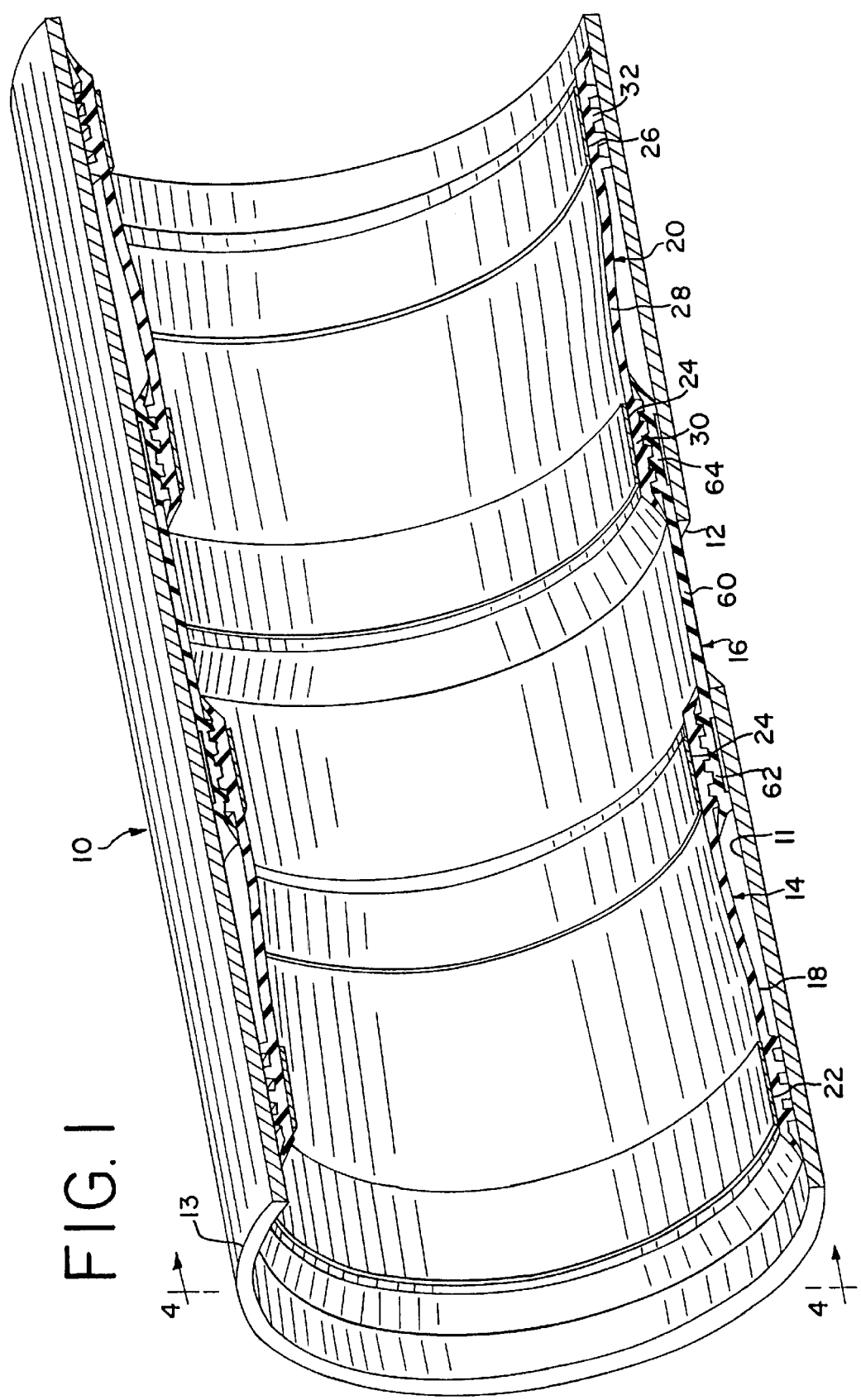
FIG. 1 is a perspective view of a portion of a conduit with a section broken away to show the interior of the conduit having a crack with a sealing installation mounted in the interior of the conduit internally sealing the conduit to prevent leakage through the crack in the conduit.
Figure 2:
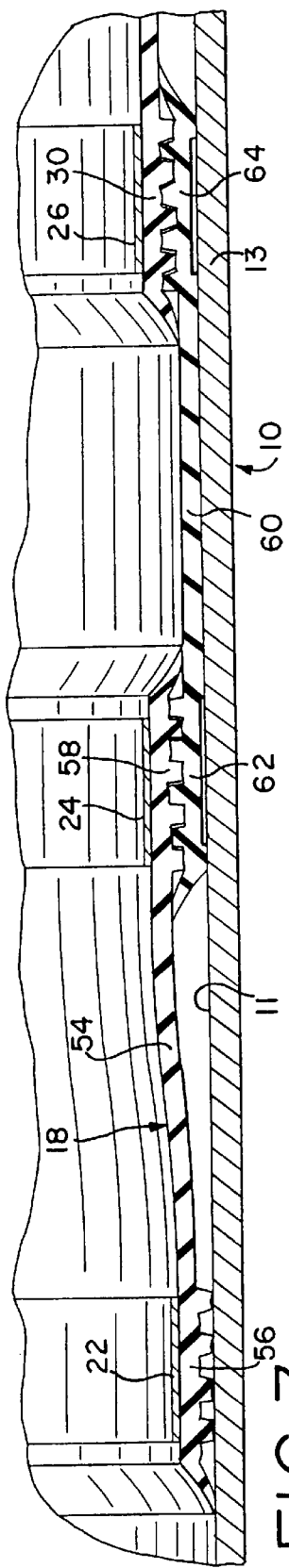
FIG. 2 is an enlarged cross sectional view showing a portion of the sealing installation of FIG. 1 with a connector sleeve having each end connected to a seal sleeve.

Referring now to the drawings, and especially to FIG. 1, a conventional conduit 10 having an interior surface 11 is shown therein with a longitudinal crack 12 extending through a sidewall 13. A sealing installation 14 embodying the herein disclosed invention is mounted in the interior of the conduit to prevent leakage through crack 12. In this instance, the conduit is shown as a conduit having a metal sidewall 13. The instant invention may be used with conduits made of a variety of materials, such as cast iron or concrete.

Sealing installation 14 includes a resilient connector sleeve 16 sealingly connected to resilient seal sleeves 18 and 20. Conventional spring steel flat retaining bands 22 and 24 are mounted in engagement with seal sleeve 18 and like retaining bands 24 and 26 are mounted in engagement with seal sleeve 20.

Connector sleeve 16 and seal sleeves 18 and 20 are identical in construction to each other. Each of the sleeves is an integral member made of a resilient rubber. In this instance, the rubber is a 60 Shore "A" Buna-N, though any other similar rubber may be used. The details of construction of seal sleeve 20 are set forth hereinafter with the understanding that the connecting sleeve 16 and seal sleeve 18 have the same construction, as described below.

Figure 3:
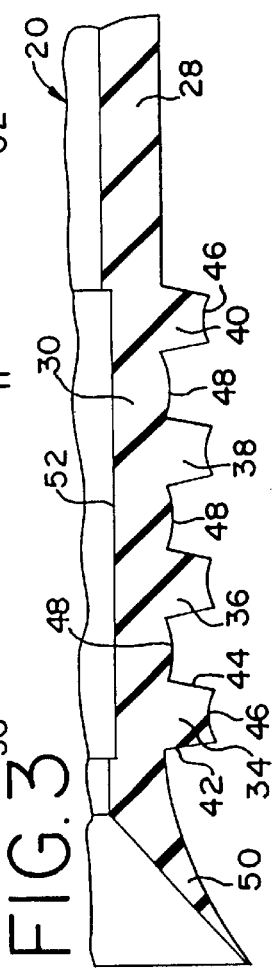
FIG. 3 is an enlarged cross sectional view of a seal sleeve sealing assembly.
Figure 4:
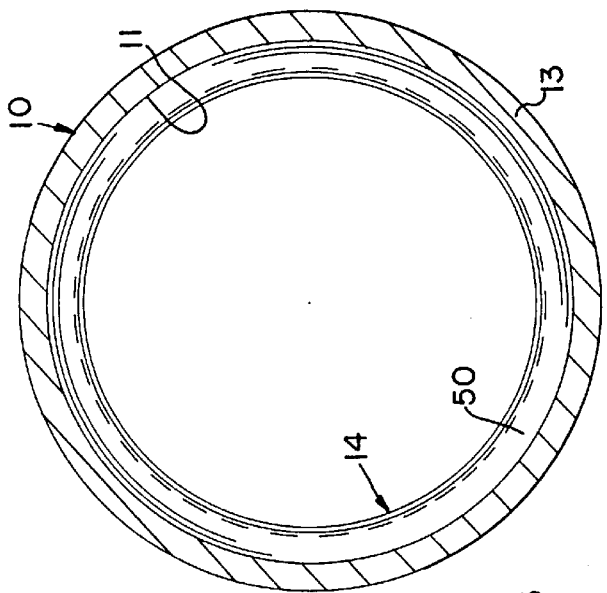
FIG. 4 is an end cross sectional view taken on Line 4—4 of FIG. 1.

Seal sleeve 20 has a resilient continuous seal sleeve body 28. The body has opposed ends with a seal sleeve sealing assembly 30 formed integral with one end and a mirror image seal sleeve sealing assembly 32 formed integral with the other end, as may be seen in FIG. 1. As may be seen in FIG. 3, sealing assembly 30 has four parallel identical resilient sealing rings 34, 36, 38, and 40 formed integral with one side of body 28. The sealing rings 34, 36, 38, and 40 are continuous to form a complete circle for each of the rings. Seal sleeve 20 has the sealing rings extending outward toward the interior surface of the conduit. Each ring has a pair of inwardly sloping faces 42 and 44, which terminate in a periphery having a concave surface 46 (identical numbers are used to identify identical parts of the sealing rings). The space between adjacent sealing rings of sealing assembly 30 is such that a like sealing ring may fit between adjacent sealing rings, that is, a like sealing ring could fit between rings 34 and 36. Another like sealing ring may fit between sealing rings 36 and 38 and still another like sealing ring may fit between sealing rings 38 and 40. Each of the sealing rings of the sealing assembly is joined to an adjacent sealing ring of the same sealing assembly by a convex surface 48. The arc of each of the convex surfaces 48 is identical to the arc of the peripheral concave surface 46, so that an end of a sealing ring may mate with a concave surface 48 when a mating sealing ring of another sealing assembly is positioned between adjacent sealing rings of sealing assembly 30. A conventional sealing lip 50 is formed integral with the remainder of the sealing assembly. The sealing assembly also includes a retaining ring recess 52 to receive and hold in place the retaining ring 24.

As was mentioned above, the other end of the seal sleeve has the sealing assembly 32 which is a mirror image of sealing assembly 30. The seal sleeve 18 is constructed in the same manner as seal sleeve 20. Seal sleeve 18 has a seal sleeve body 54 identical to seal sleeve body 28. Seal sleeve body 54 as opposed ends with seal sleeve sealing assemblies 56 and 58 formed integral with respective opposed ends. Seal sleeve sealing assemblies 56 and 58 are identical in construction to seal sleeve sealing assemblies 30 and 32, respectively.

Connector sleeve 16 has the same construction as seal sleeve 20, including a connector body 60 which is identical to seal sleeve body 28. Connector body 60 has opposed ends with connector sealing assemblies 62 and 64 mounted on the opposed ends. Connector sealing assemblies 62 and 64 are identical to seal sleeve sealing assemblies 30 and 32, respectively. Connector sleeve 16 is formed from a seal sleeve, such as, seal sleeve 18 or 20 by turning a seal sleeve inside out as one might turn a glove inside out to convert a right-hand glove to a left-hand glove. Then the sealing rings of the connector sleeve extend inward of the conduit as opposed to extending outward toward the interior surface of the conduit, as shown for seal sleeves 18 and 20 in FIG. 1.

Figure 5:
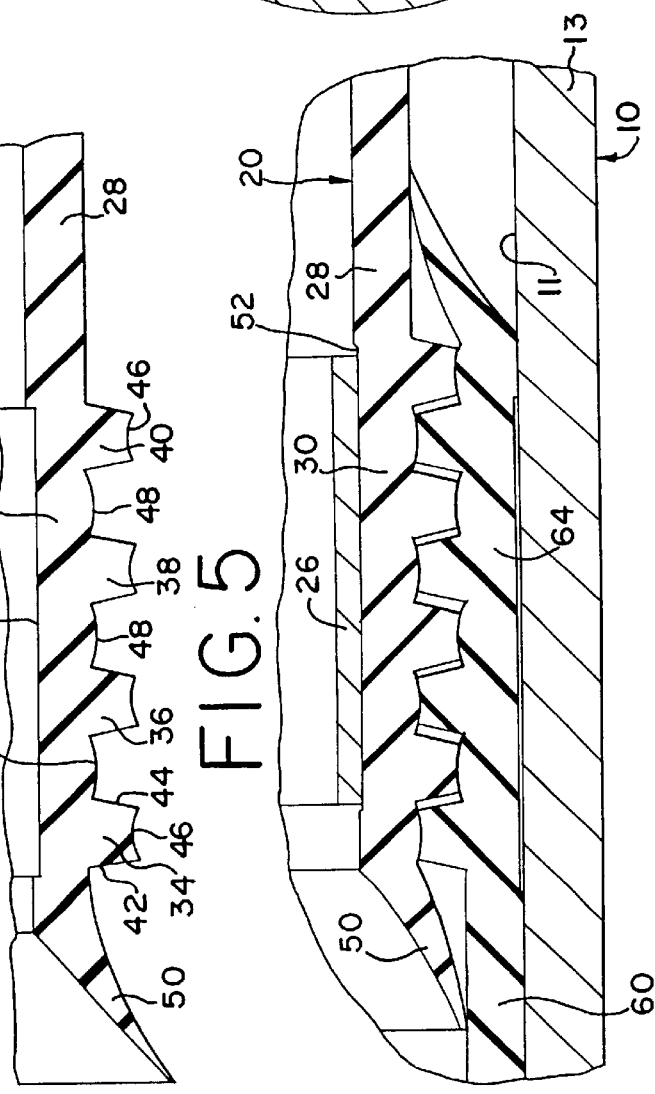
FIG. 5 is an enlarged cross sectional view showing a seal sleeve sealing assembly in sealing engagement with a connector sealing assembly positioned in the conduit with a retaining ring holding the seal sleeve sealing assembly in sealing engagement with the connector sealing assembly.

The sealing installation is made in a conduit by first inverting the sleeve to make it a connector sleeve 16, which is then positioned over crack 12. Seal sleeve 20 is positioned in conduit 10 with the sealing rings of seal sleeve sealing assembly 30 positioned between the sealing rings of connector sleeve sealing assembly 64, as shown in FIG. 5. The concave surfaces of the peripheral ends of the rings mate with the respective convex surface of the connector sleeve sealing assembly 64. As may be seen in FIG. 5, the sealing rings of seal sleeve sealing assembly 30 and the sealing rings of the connector sealing assembly 64 are intercalated to engage mateably. Retaining ring 24 is positioned in retaining ring recess 52, so that the resilience of the retaining ring holds the sealing rings of the seal sleeve sealing assembly 30 in sealing contact with the sealing rings of the connector sleeve sealing assembly 14. Sealing assembly 32 on the other end of the seal sleeve 20 has its sealing rings positioned in contact with the interior of the conduit. Retaining ring 32 is positioned in its retaining ring recess to hold lip 50 and the sealing rings of sealing assembly 32 in sealing contact with the interior of the conduit to provide a seal therebetween.

In a like manner, seal sleeve 18 is positioned in the interior of the conduit with sealing assembly 58 in sealing contact with connector sleeve sealing assembly 62. The concave surface of the peripheral ends of the sealing rings mate with respective convex surface of connector sleeve sealing assembly 64. The sealing ring assembly 58 and the sealing rings of seal sleeve sealing assembly 62 are intercalated to engage mateably. Retaining ring 24 in the retaining ring recess holds the sealing assemblies in resilient sealing engagement. The other end of the seal sleeve 18 has the lip and sealing rings of the other sealing assembly 56 in contact with the interior of conduit 10. Retaining ring 22 is mounted in the retaining ring recess of sealing assembly 56 to cause the lip and the sealing rings of the sealing assembly to engage sealingly the interior of the conduit. Sealing assembly 32 creates a seal with the conduit. A seal extends from sealing assembly 32 to sealing assembly 56 of seal sleeve 18 which is in sealing contact with the interior of the conduit. The space between the two sealing assemblies is sealed off to prevent leakage through crack 12 in the conduit over the length of the conduit covered by the sealing installation.

In the event that the sealing installation described above is of insufficient length to cover a deformity in the conduit, a second connector sleeve may be placed in engagement with the seal assembly of one of the seal sleeves and a third seal sleeve connected to the second connector sleeve to further extend the length of conduit sealed by the sealing installation.

It is particularly advantageous for the installation to be able to extend the length of the seal, as is desired when the interior of the conduit is finally inspected. Not only may the present sealing installation be used to seal existing leaks, it may also be used to seal portions of the conduit, which upon inspection indicate that a leak may develop at a later date.

Although a specific embodiment of the herein disclosed invention has been described in detail above, it is readily apparent that those skilled in the art may make various modifications and changes in the herein disclosed invention without departing from the spirit and scope of the invention. It is to be expressly understood that the instant invention is limited only by the appended claims.

What is claimed is:

1. A sealing installation mounted in the interior of a conduit for internally sealing the conduit to prevent leakage therefrom including: a resilient connector sleeve having a continuous connector body with opposed ends, a connector sealing assembly formed integral with each end of the connector body, each connector sealing assembly being a substantial mirror image of the other connector sealing assembly, said connector sleeve being oriented with each connector sealing assembly extending inward toward the interior of the conduit, a first seal sleeve having a continuous seal sleeve body with opposed ends, a seal sleeve sealing assembly mounted on each end of the seal sleeve body, one of said seal sleeve sealing assemblies in sealing engagement with one of the connector sealing assemblies, the other seal sleeve sealing assembly in sealing engagement with the interior of the conduit, and a second seal sleeve having a resilient continuous second sleeve body with opposed ends, a second seal sleeve sealing assembly mounted on each end of the second seal sleeve body, one of the second seal sleeve assemblies in sealing engagement with the other of the connector sealing assemblies, and the other second seal sleeve sealing assembly in sealing engagement with the interior of the conduit.

2. A sealing installation mounted in the interior of a conduit for internally sealing the conduit to prevent leakage therefrom as defined in claim 1, wherein each sealing assembly includes a plurality of parallel sealing rings formed integral with one side of the respective body, each sealing ring having a cross section substantially identical to the cross section of each other sealing ring, each sealing ring in each sealing assembly being spaced from each adjacent sealing ring a distance sufficient to receive sealingly a like sealing ring between adjacent sealing rings, whereby the one seal sleeve sealing assembly having sealing rings between sealing rings of the one of the connector sealing assemblies to provide sealing engagement between the respective sealing assemblies and the one second seal sleeve sealing assembly having sealing rings between sealing rings of the other connector sealing assembly to provide sealing engagement between the respective sealing assemblies.

3. A sealing installation mounted in the interior of a conduit for internally sealing the conduit to prevent leakage therefrom as defined in claim 1, wherein each sealing assembly includes a plurality of parallel sealing rings formed integral with one side of the respective body, each sealing ring having a cross section substantially identical to the cross section of each other sealing ring, each sealing ring in each sealing assembly being spaced from each adjacent sealing ring a distance sufficient to receive sealingly a like sealing ring between adjacent sealing rings, each sealing ring has a periphery spaced from the body, each periphery having a concave surface, whereby the one seal sleeve sealing assembly having sealing rings between sealing rings of the one of the connector sealing assemblies to provide sealing engagement between the respective sealing assemblies and the one second seal sleeve sealing assembly having sealing rings between sealing rings of the other connector sealing assembly to provide sealing engagement between the respective sealing assemblies.

4. A sealing installation mounted in the interior of a conduit for internally sealing the conduit to prevent leakage therefrom as defined in claim 1, wherein each sealing assembly includes a plurality of parallel sealing rings formed integral with one side of the respective body, each sealing ring having a cross section substantially identical to the cross section of each other sealing ring, each sealing ring in each sealing assembly being spaced from each adjacent sealing ring a distance sufficient to receive sealingly a like sealing ring between adjacent sealing rings, adjacent sealing rings of the same sealing assembly being connected by a convex surface formed integral with the body, whereby the one seal sleeve sealing assembly having sealing rings between sealing rings of the one of the connector sealing assemblies to provide sealing engagement between the respective sealing assemblies and the one second seal sleeve sealing assembly having sealing rings between sealing rings of the other connector sealing assembly to provide sealing engagement between the respective sealing assemblies.

5. A sealing installation mounted in the interior of a conduit for internally sealing the conduit to prevent leakage therefrom as defined in claim 1, wherein each sealing assembly includes a plurality of parallel sealing rings formed integral with one side of the respective body, each sealing ring having a cross section substantially identical to the cross section of each other sealing ring, each sealing ring in each sealing assembly being spaced from each adjacent sealing ring a distance sufficient to receive sealingly a like sealing ring between adjacent sealing rings, each of sealing rings having a pair of opposed continuous faces sloping toward each other defining the cross section of the respective sealing ring, whereby the one seal sleeve sealing assembly having sealing rings between sealing rings of the one of the connector sealing assemblies to provide sealing engagement between the respective sealing assemblies and the one second seal sleeve sealing assembly having sealing rings between sealing rings of the other connector sealing assembly to provide sealing engagement between the respective sealing assemblies.

6. A sealing installation mounted in the interior of a conduit for internally sealing the conduit to prevent leakage therefrom as defined in claim 1, wherein each sealing assembly includes a plurality of parallel sealing rings formed integral with one side of the respective body, each sealing ring having a cross section substantially identical to the cross section of each other sealing ring, each sealing ring in each sealing assembly being spaced from each adjacent sealing ring a distance sufficient to receive sealingly a like sealing ring between adjacent sealing rings, each sealing ring has a periphery spaced from the one side of the body, each periphery having a concave surface, adjacent sealing rings of the same sealing assembly being connected by a convex surface formed integral with the body, whereby the one seal sleeve sealing assembly having sealing rings between sealing rings of the one of the connector sealing assemblies to provide sealing engagement between the respective sealing assemblies and the one second seal sleeve sealing assembly having sealing rings between sealing rings of the other connector sealing assembly to provide sealing engagement between the respective sealing assemblies.

7. A sealing installation mounted in the interior of a conduit for internally sealing the conduit to prevent leakage therefrom as defined in claim 1, wherein each sealing assembly includes a plurality of parallel sealing rings formed integral with one side of the respective body, each sealing ring having a cross section substantially identical to the cross section of each other sealing ring, each sealing ring in each sealing assembly being spaced from each adjacent sealing ring a distance sufficient to receive sealingly a like sealing ring between adjacent sealing rings, each of the sealing rings has a pair of opposed continuous faces sloping toward each other defining the cross section of the respective sealing ring, each sealing ring having a periphery between the pair of opposed continuous faces spaced from the body, each periphery having a concave surface extending between the respective opposed continuous faces of the sealing ring, whereby the one seal sleeve sealing assembly having sealing rings between sealing rings of the one of the connector sealing assemblies to provide sealing engagement between the respective sealing assemblies and the one second seal sleeve sealing assembly having sealing rings between sealing rings of the other connector sealing assembly to provide sealing engagement between the respective sealing assemblies.

8. A sealing installation mounted in the interior of a conduit for internally sealing the conduit to prevent leakage therefrom as defined in claim 1, wherein each sealing assembly includes a plurality of parallel sealing rings formed integral with one side of the respective body, each sealing ring having a cross section substantially identical to the cross section of each other sealing ring, each sealing ring in each sealing assembly being spaced from each adjacent sealing ring a distance sufficient to receive sealingly a like sealing ring between adjacent sealing rings, each of the sealing rings has a pair of opposed continuous faces sloping toward each other defining the cross section of the respective sealing ring, the space between opposed continuous faces of the adjacent sealing rings being convex, whereby the one seal sleeve sealing assembly having sealing rings between sealing rings of the one of the connector sealing assemblies to provide sealing engagement between the respective sealing assemblies and the one second seal sleeve sealing assembly having sealing rings between sealing rings of the other connector sealing assembly to provide sealing engagement between the respective sealing assemblies.

9. A sealing installation mounted in the interior of a conduit for internally sealing the conduit to prevent leakage therefrom as defined in claim 1, wherein each sealing assembly includes a plurality of parallel sealing rings formed integral with one side of the respective body, each sealing ring having a cross section substantially identical to the cross section of each other sealing ring, each sealing ring in each sealing assembly being spaced from each adjacent sealing ring a distance sufficient to receive sealingly a like sealing ring between adjacent sealing rings, each of the sealing rings having a pair of opposed continuous faces sloping toward each other defining the cross section of the respective sealing ring, each sealing ring has a continuous periphery spaced from the body, each periphery having a concave surface extending between the opposed continuous faces of the respective sealing ring, a convex connecting surface being formed integral with the body between adjacent sealing rings of the same sealing assembly, an annular lip formed integral with the body adjacent to each sealing assembly at each of the opposed ends, a retaining band connected to the one seal sleeve sealing assembly holding the one seal sleeve sealing assembly in sealing engagement with the one connector sealing assembly, a second retaining band connected to the other seal sleeve sealing assembly holding the other seal sleeve sealing assembly in sealing engagement with the interior of the conduit, a third retaining band connected to the one second seal sleeve sealing assembly holding the one second seal sleeve sealing assembly in sealing engagement with the other connector sealing assembly, and a fourth retaining band connected to the other second seal sleeve sealing assembly holding the other second seal sleeve sealing assembly in sealing engagement with the interior of the conduit, whereby the one seal sleeve sealing assembly having sealing rings between sealing rings of the one of the connector sealing assemblies to provide sealing engagement between the respective sealing assemblies and the one second seal sleeve sealing assembly having sealing rings between sealing rings of the other connector sealing assembly to provide sealing engagement between the respective sealing assemblies.

10. A seal sleeve for sealing a conduit internally including; a continuous flat resilient body having opposed ends, a resilient sealing assembly formed integral with each end of the body, each sealing assembly being a substantial mirror image of the other assembly, said resilient body and said sealing assemblies being invertible, each sealing assembly including a plurality of continuous resilient sealing rings formed integral with one side of the body, each sealing ring having a cross section substantially identical to the cross section of each other sealing ring, and each sealing ring in each sealing assembly being spaced from each adjacent sealing ring in the same sealing assembly a distance sufficient to receive sealingly a like sealing ring between adjacent sealing rings in the same sealing assembly.

11. A seal sleeve for sealing a conduit internally as defined in claim 10, wherein each sealing ring has a continuous periphery spaced from the one side of the body, each periphery having a continuous concave surface.

12. A sleeve seal for sealing a conduit internally as defined in claim 10, wherein adjacent sealing rings of the same sealing assembly are connected by a respective continuous convex surface integral with the one side of the body.

13. A seal sleeve for sealing a conduit internally as defined in claim 10, wherein each of sealing rings having a pair of opposed continuous faces sloping toward each other defining the cross section of the respective sealing ring.

14. A seal sleeve for sealing a conduit internally as defined in claim 10, wherein each sealing ring has a periphery spaced from the one side of the body, each periphery has a concave surface, adjacent sealing rings of the same sealing assembly are connected by a respective continuous convex surface integral with the one side of the body.

15. A seal sleeve for sealing a conduit internally as defined in claim 10, wherein each of the sealing rings has a pair of opposed continuous faces sloping toward each other defining the cross section of the respective sealing ring, each sealing ring having a periphery between the pair of opposed continuous faces spaced from the one side of the body, each periphery having a continuous concave surface extending between the respective opposed continuous faces of the sealing ring.

16. A seal sleeve for sealing a conduit internally as defined in claim 10, wherein each of the sealing rings has a pair of opposed continuous faces sloping toward each other defining the cross section of the respective sealing ring, a surface of the one side of the body between opposed continuous faces of the adjacent sealing rings being convex.

17. A seal sleeve for sealing a conduit internally as defined in claim 10, wherein each of the sealing rings has a pair of opposed continuous faces sloping toward each other defining the cross section of the respective sealing ring, each sealing ring has a continuous periphery spaced from the one side of the body, each periphery having a concave surface extending between the opposed continuous faces of the respective sealing ring, a convex connecting surface formed integral with the one side of the body between adjacent sealing rings of the same sealing assembly, and an annular lip formed integral with the body at each of the opposed ends.

18. A seal sleeve for sealing a conduit internally as defined in claim 10, wherein each of the sealing rings has a pair of opposed continuous faces formed integral with the body and sloping toward each other defining the cross section of the respective sealing ring, each sealing ring has a continuous periphery spaced from the one side of the body, each periphery of each sealing ring being the same distance from the one side of the body as the periphery of each other sealing ring, each periphery having a concave surface extending between the opposed continuous faces of the respective sealing ring, each concave surface defining an arc identical to the arc of each other concave surface, a convex connecting surface formed integral with the one side of the body between adjacent sealing rings of the same sealing assembly, each convex connecting surface defining an arc substantially identical to the arc of each concave surface of each sealing ring, and an annular lip formed integral with the body at each of the opposed ends.

* * * * *